Feb. 15, 1966 R. STAPELFELDT 3,235,817
ELECTRICAL CIRCUIT CAPABLE OF SELECTIVELY AND SIMULTANEOUSLY OSCILLATING AT A PLURALITY OF DIFFERENT FREQUENCIES WITH NO INTERMODULATION OCCURRING BETWEEN THE OSCILLATING FREQUENCIES
Filed Dec. 28, 1962 2 Sheets-Sheet 1

INVENTOR.
Roelif Stapelfeldt.
BY
W. L. Stout.
HIS ATTORNEY

INVENTOR.
Roelif Stapelfeldt.
BY W. L. Stout.
HIS ATTORNEY

United States Patent Office 3,235,817

Patented Feb. 15, 1966

3,235,817

ELECTRICAL CIRCUIT CAPABLE OF SELECTIVELY AND SIMULTANEOUSLY OSCILLATING AT A PLURALITY OF DIFFERENT FREQUENCIES WITH NO INTERMODULATION OCCURRING BETWEEN THE OSCILLATING FREQUENCIES

Roelif Stapelfeldt, Cleveland, Ohio, assignor to Westinghouse Air Brake Company, Swissvale, Pa., a corporation of Pennsylvania

Filed Dec. 28, 1962, Ser. No. 247,890
7 Claims. (Cl. 331—106)

This invention relates to oscillator circuits, and more particularly to a circuit capable of simultaneously oscillating at a plurality of frequencies without any intermodulation between the frequencies.

It is frequently desirable to have some means capable of producing simultaneous oscillations at a plurality of different frequencies. For example, in telemetering and carrier code equipment, information is frequently transmitted by a relatively high frequency carrier wave which is modulated by one or more audio frequencies, with the information being transmitted being represented by the presence or absence of these modulating frequencies. Thus, in such an application, it would be useful to provide a single relatively simple electronic circuit which is capable of simultaneously oscillating at a plurality of different frequencies.

There is a class of oscillating circuits known as negative resistance oscillators in which a circuit is provided which includes a pair of terminals between which is exhibited an effective negative resistance. Such a circuit is utilized in an oscillator by connecting a series resonant circuit, that is, a series circuit consisting of an inductance and a capacitance, between the terminals which exhibit the effective negative resistance. As is well known to those skilled in the art, if the magnitude of the effective negative resistance of the circuit is greater than the effective resistance of the series resonant circuit, the circuit oscillates at the resonant frequency of the series resonant circuit.

This type of negative resistance oscillator is relatively simple and inexpensive and would thus apparently readily lend itself to use in a telemetering system such as was previously mentioned. However, experience has shown that if a plurality of series resonant circuits, each resonant at a different frequency, are connected between the pair of terminals which exhibits the effective negative resistance, much intermodulation occurs between the resonant frequencies of the series resonant circuits, with the resultant production of harmonic frequencies which may adversely affect the operation of the telemetering system. Thus, if it is desired to use such negative resistance oscillating circuits in telemetering systems and other like applications, it is necessary to provide a completely separate oscillating circuit for each frequency desired.

It is accordingly an object of this invention to provide an improved oscillating circuit.

It is another object of this invention to provide an improved negative resistance oscillating circuit.

It is yet another object of this invention to provide an improved negative resistance oscillating circuit which is capable of simultaneously oscillating at a plurality of frequencies.

It is still another object of this invention to provide an improved negative resistance oscillating circuit which is capable of simultaneously oscillating at a plurality of different frequencies, and in which no intermodulation occurs between the oscillating frequencies.

Briefly stated, and in accordance with one embodiment of the present invention, a negative resistance oscillating circuit capable of oscillating simultaneously at a plurality of different frequencies is provided with includes a first circuit which exhibits an effective negative resistance between a given pair of terminals. A plurality of series resonant tuned circuits are connected between this pair of terminals, with each of these series resonant circuits tuned to resonate at a respective predetermined frequency. Further means are provided to increase the effective resistance of each of the series resonant circuits as the amplitude of the electrical energy oscillating in series resonant circuits increases, which increase in effective resistance prevents intermodulation among the oscillating frequencies.

Other objects and advantages of the invention, together with a complete understanding of the operation thereof, may be obtained from the following description of the attached drawings, in which.

Figure 5:
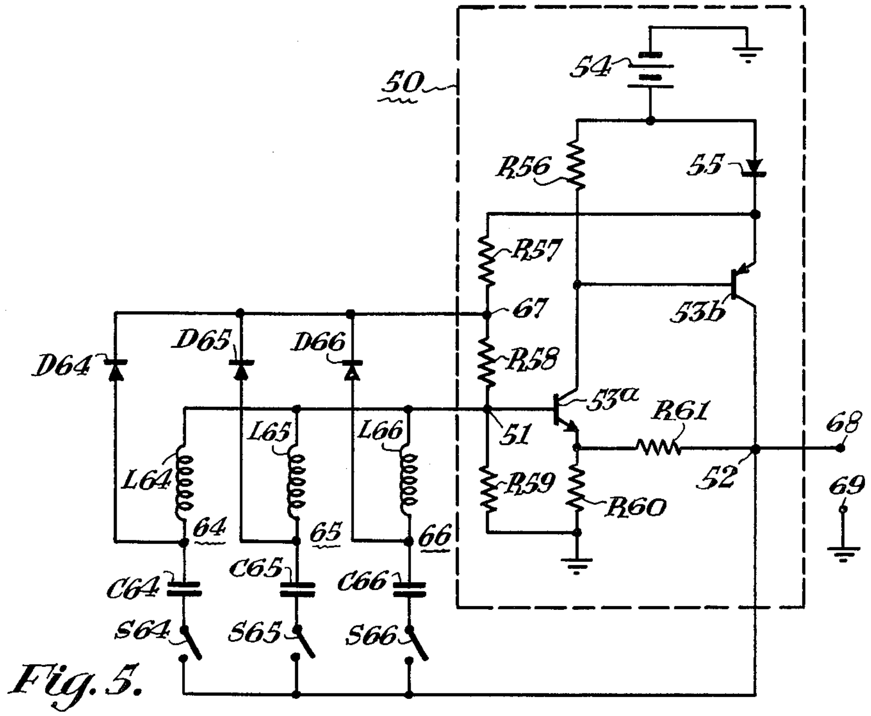
Figure 6:
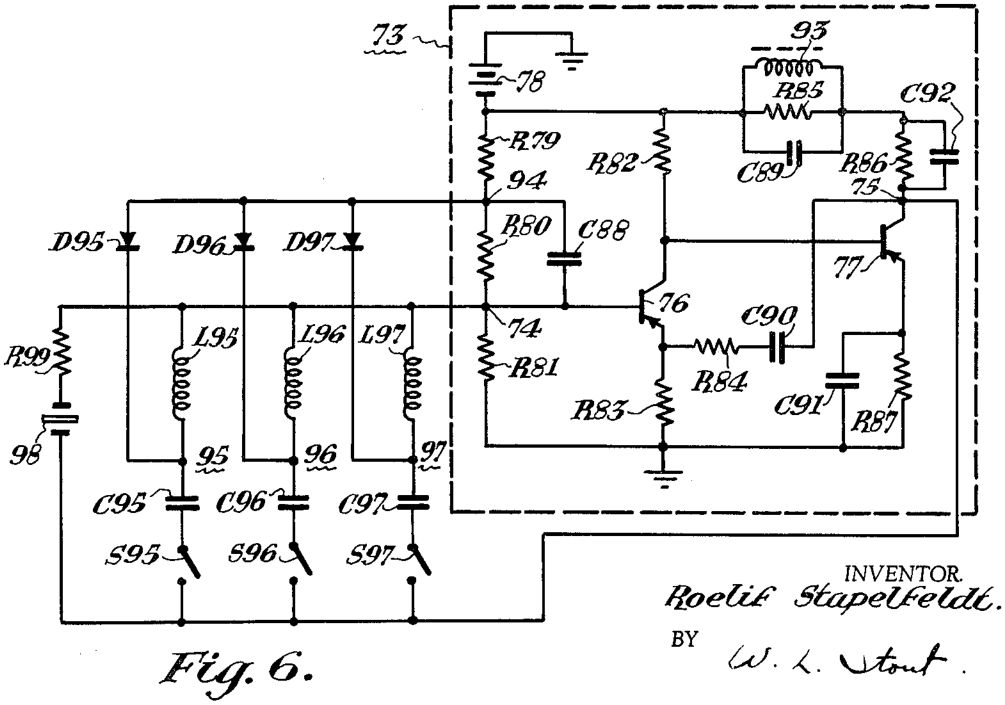

FIG. 5 shows a negative resistance circuit in accordance with the present invention and which is capable of simultaneously oscillating at any desired combination of three distinct frequencies; and FIG. 6 shows a circuit similar to that of FIG. 5 but which includes a radio frequency element for providing a relatively high carrier frequency which may be modulated by any desired combination of three relatively lower modulating frequencies.

In the following description, like reference characters are used to identify like parts in the various drawings whenever possible.

Figure 1:
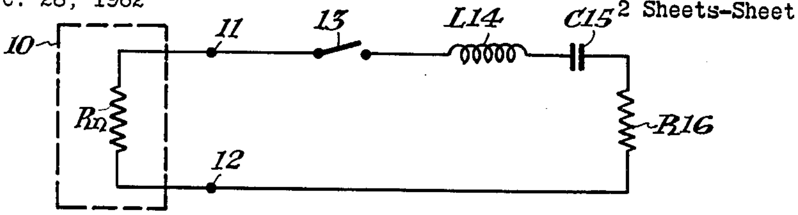
FIG. 1 represents a diagrammatic illustration of a simple negative resistance oscillator.

Referring now to FIG. 1, therein is shown a schematic representation of a conventional negative resistance oscillator circuit. The circuit includes a source of negative resistance 10 which exhibits an effective negative resistance between terminals 11 and 12. Serially connected between the terminals 11 and 12 is a switch 13, an inductance L14, a capacitance C15 and a resistance R16. In practice, the resistance R16 usually represents the resistive component of the inductive element which provides the inductance L14 in the circuit. If the magnitude of the effective negative resistance from source 10 is greater than the magnitude of the resistance R16, oscillations will build up in the series circuit, with the current flowing therein being described by the equation $$i=Ke^{\left[\frac{|R_n|-R}{2L}t-j\sqrt{\frac{1}{LC}-\frac{(R_n-R)^2}{4L^2}}t\right]} \qquad (1)$$

where $i$=current flowing in the circuit
$K$=a constant
$R_n$=the effective value of the negative resistance
$R$=the equivalent resistance of the series circuit
$L$=the value of the inductance
$C$=the value of the capacitance
$t$=the time after the switch 13 is closed.

Theoretically, and in agreement with the above Equation (1), if the switch 13 is closed at a time $t=0$, there begins a buildup of an oscillation at a frequency equal to $$\sqrt{\frac{1}{LC}-\frac{(|R_n|-R)^2}{4L^2}}$$

with an oscillation envelope amplitude which increases exponentially proportionally to $$\frac{|R_n|-R}{2L}$$

In the practical situation, this exponential buildup is eventually limited by nonlinearities in the circuit, usually in the negative resistance source 10. The amplitude of oscillation eventually stabilizes at a steady state value at which the energy the negative resistance source 10 adds to the series tuned circuit per cycle of oscillation exactly equals the energy lost in the tuned circuit per cycle of oscillation. At this steady state oscillation, the average negative resistance of the source 10 is equal to the equivalent positive resistance of the series tuned circuit. At this time, the above Equation (1) shows that the value of current flowing in the circuit is equal to $$i=e\left[-j\sqrt{\frac{1}{LC}}t\right] \qquad (2)$$

which, as is well known to those skilled in the art, represents a sinusoidal wave having a frequency equal to $$\sqrt{\frac{1}{LC}}$$

Figure 2A:
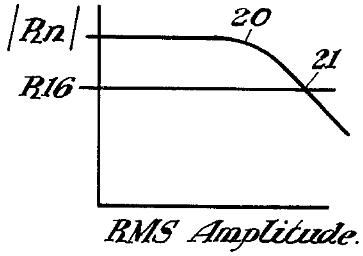
FIGS. 2A and 2B are graphic illustrations of the values of the effective negative resistance and effective positive resistance of the circuit of FIG. 1 as a function of the RMS amplitude of the electrical energy stored in the circuit.

FIG. 2A shows a graphical representation of the operation of the circuit of FIG. 1. Therein is shown the relative magnitudes of the values of the negative resistance of source 10 and the value of resistance R16 as a function of the R.M.S. amplitude of the electrical energy oscillating in the series resonant circuit. As shown by FIG. 2A, for low values of electrical energy, the magnitude of the negative resistance is greater than that of the positive resistance of the series tuned circuit, and the amplitude of the oscillating current in the circuit increases according to Equation (1) above. At some point 20, the magnitude of the equivalent negative resistance of source 10 begins to decrease until at a point 21 the magnitude of the negative resistance exactly equals that of the positive resistance of the circuit, and at this point 21 stable oscillation occurs. It is observed that point 21 occurs at a point in the nonlinear region of the negative resistance source 10.

If a multitone oscillator is formed by connecting a plurality of series tuned circuits between terminals 11 and 12 of FIG. 1, with each of the series tuned circuits resonating at a different frequency, intermodulation between the different frequencies occurs because the negative resistance source 10 is operating in its nonlinear region at the point where stable oscillation occurs, as is shown in FIG. 2A.

Figure 2B:
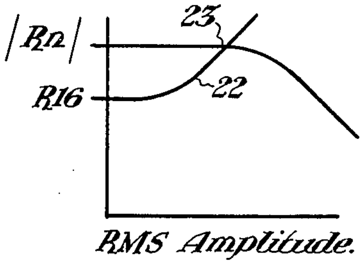

FIG. 2B, which is similar to FIG. 2A, shows the relative magnitudes of the negative resistance and positive resistance of a circuit such as is shown in FIG. 1 as a function of the R.M.S. amplitude of the electrical energy oscillating in the series circuit when the present invention is utilized. If as is shown therein, means are provided for increasing the magnitude of the positive resistance at some point 22 such that the value of the positive resistance increases as the R.M.S. amplitude of the electrical energy in the circuit increases, the magnitudes of the positive and negative resistances become equal at a point 23 which occurs in the linear region of the graph showing the magnitude of the negative resistance as a function of the R.M.S. amplitude of the electrical energy in the circuit. Thus, as will later be described in detail, a plurality of series tuned circuits may be connected between terminals 11 and 12 of the circuit of FIG. 1 such that the circuit simultaneously oscillates at a plurality of different frequencies. Now, however, since the negative resistance source 10 is operating in its linear region, no intermodulation occurs between the simultaneously oscillating frequencies and the net result is only the sum of the simultaneously operating frequencies, with no modulation products being present.

Figure 3A:
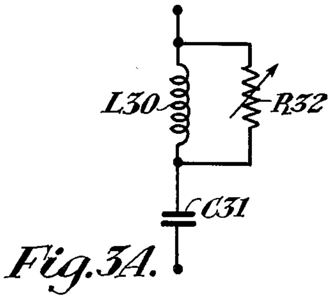
FIGS. 3A and 3B show simple resonant series circuits in which one of the reactive elements is shunted by a variable resistance element.
Figure 3B:
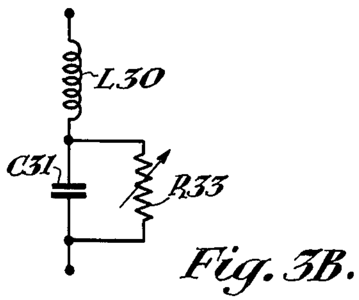

FIGS. 3A and 3B show means whereby the equivalent series resistance of a series tuned circuit may be varied. FIG. 3A shows a series tuned circuit which includes an inductance L30 and a capacitance C31. In parallel with inductance L30 is a variable resistance R32. It will be shown below that the equivalent resistance of the series resonant circuit is approximately inversely proportional to the magnitude of the variable resistance R32.

The total impedance of the circuit FIG. 3A may be given by the following equation:

$$Z3A=\frac{1}{\omega C31}+\frac{(R32)(j\omega L30)}{R32+j\omega L30} \qquad (3)$$

where $Z3A$=the total impedance of the series circuit and $\omega$=the frequency at which the circuit is operating.

Equation (3) may be divided into its real and imaginary components into the following expressions:

$$Z3A=\frac{\omega^2(L30)^2(R32)}{(R32)^2+\omega^2(L30)^2}+j\left[\frac{\omega(L30)(R32)^2}{(R32)^2+\omega^2(L30)^2}-\frac{1}{\omega(C31)}\right] \qquad (4)$$

When the circuit is tuned to resonance or operating at its resonant frequency, that is, when the phase angle of the series circuit is zero, the imaginary component of Equation (4) above becomes zero and the equivalent series resistance of the circuit at this time may be represented by the following equation:

$$R_{eq}=\frac{\omega^2(L30)^2(R32)}{(R32)^2+\omega^2(L30)^2} \qquad (5)$$

where $R_{eq}$ represents the equivalent series resistance of the circuit at its resonant frequency.

Equation (5) above may be further simplified to the following equation:

$$R_{eq}=\frac{R32}{1+\frac{(R32)^2}{\omega^2(L30)^2}} \qquad (6)$$

At this point it is useful to introduce the concept of the quality factor, or Q, of a resonant circuit. The Q of a resonant circuit may be defined as the ratio of the peak energy stored per cycle in a resonant system to the energy lost per cycle. This definition may be applied to either an electrical resonant system or a mechanical resonant system. For an electrical resonant circuit such as is shown in FIG. 3A, in which an inductance is connected in parallel with a resistance, assuming the components to be of purely inductive, resistive and capacitive values, the Q of the circuit may be defined by the following equation:

$$Q=\frac{R}{\omega L} \qquad (7)$$

where $Q$=the quality factor of the circuit
$R$=the value of the resistive component
$L$=the value of the inductive component of the circuit
$\omega$=the operating frequency of the circuit Applying the definition of Equation (7) to Equation (6) yields the following equation:

$$R_{eq}=\frac{R32}{1+Q^2} \qquad (8)$$

and if the value of the Q of the circuit is relatively high, it yields the following approximation:

$$R_{eq}\cong\frac{R32}{Q^2} \qquad (9)$$

This is a reasonable approximation to make, since for a circuit having a Q of, say, 6 or higher, the error in the approximation becomes less than 3%.

Applying to the definition of Equation (7) to the approximation of Equation (9) yields the following:

$$R_{eq}\cong\frac{R32}{(R32)^2/\omega^2(L30)^2}=\frac{\omega^2(L30)^2}{R32} \qquad (10)$$

Thus, it is seen that for reasonable values of the Q of the circuit of FIG. 3A, the effective equivalent series resistance of the circuit at its resonant frequency varies inversely with the magnitude of the variable resistor R32.

FIG. 3B shows a circuit similar to that of FIG. 3A but in which a variable resistance R33 is connected in parallel with the capacitance C31. Again, it will be shown that the equivalent series resistance of the circuit, assuming a reasonably high value of the Q of the circuit again, is inversely proportional to the magnitude of the resistance R33.

The impedance of the circuit of FIG. 3B may be given by the following equation:

$$Z3B=j\omega(L30)+\frac{-j\frac{R33}{\omega C31}}{R33-j\frac{1}{\omega C31}} \qquad (11)$$

where $Z3B$=the impedance of the circuit
$R33$=the value of the resistance R33 and the other components are the same as in the above equations.

Equation (11) above may be separated into real and imaginary components into the following equation:

$$Z3B=\frac{\frac{R33}{\omega^2(C31)^2}}{(R33)^2+\frac{1}{\omega^2(C31)^2}}+j\left[\omega L30-\frac{\frac{(R33)^2}{\omega C31}}{(R33)^2+\frac{1}{\omega^2(C31)^2}}\right] \qquad (12)$$

Again, at resonant frequency the imaginary component of the impedance becomes zero and the equivalent resistance of the series circuit may be represented by the following equation:

$$R_{eq}=\frac{\frac{R33}{\omega^2(C31)^2}}{(R33)^2+\frac{1}{\omega^2(C31)^2}} \qquad (13)$$

Equation (13) above may be simplified into the following equation:

$$R_{eq}=\frac{R33}{(R33)^2\omega^2(C31)^2+1} \qquad (14)$$

At the resonant frequency of the circuit, and ignoring the slight resistive tuning effect of resistance R33, the following expression holds true:

$$\omega L30=\frac{1}{\omega C31} \qquad (15)$$

and substituting Equation (15) into the definition of the Q of the circuit at Equation (7) above yields the following expression:

$$Q\equiv\omega(C31)(R33) \qquad (16)$$

Substituting the definition of Equation (16) into Equation (14) yields the following result:

$$R_{eq}=\frac{R33}{Q^2+1} \qquad (17)$$

Again, if the value of the Q of the circuit is relatively high, say, 6 or greater, the following approximation may be made with little error:

$$R_{eq}\cong\frac{R33}{Q^2} \qquad (18)$$

Substituting now the definition of Equation (16) into the approximation of Equation (18) yields the following result:

$$R_{eq}\cong\frac{R33}{(R33)^2\omega^2(C31)^2}=\frac{1}{R33\omega(C31)^2} \qquad (19)$$

It is thereby shown that for reasonable values of Q of the circuit, the equivalent series of resistance of the circuit of FIG. 3B at its resonant frequency is again inversely proportional to the magnitude of resistance R33. Thus, it is seen that it does not matter which of the reactive elements of the series tuned circuits is shunted by the variable resistance to produce the desired effect of having the equivalent series resistance of the circuit at resonance increase as the magnitude of the shunting resistance decreases.

Figure 4A:
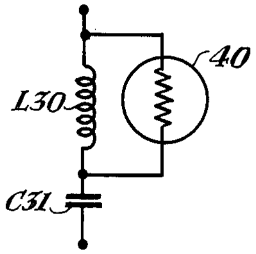
FIGS. 4A, 4B and 4C show series resonant circuits in which the inductive element thereof is shunted by a nonlinear resistance element in accordance with the present invention.
Figure 4B:
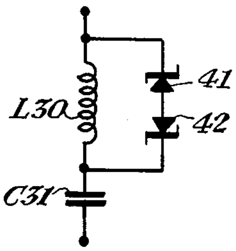
Figure 4C:
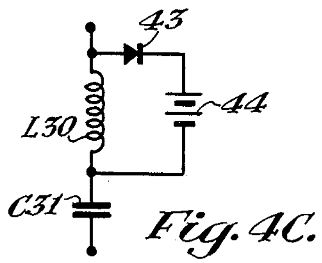

Although any desired means may be used to effect this result, FIGS. 4A, 4B and 4C show three series tuned circuits in which the inductive reactive element of the series tuned circuit is shunted by a relatively simple circuit component the resistance of which decreases as the magnitude of the electrical energy oscillating in the series tuned circuit increases. As was described in connection with FIGS. 3A and 3B, this decrease in the value of the resistance of the shunting component results in an effective increase in the equivalent resistive value of the series tuned circuit at its resonant frequency, and as was explained in connection with FIG. 2B above, this increase in the effective resistive value as the R.M.S. amplitude of the electrical energy in the circuit increases results in the operation of a negative resistance oscillator in the stable region of the negative resistance source, whereby the negative resistance source may be used to simultaneously drive a plurality of tuned circuits resonating at different frequencies without any intermodulation between the different frequencies so generated.

FIG. 4A shows a series tuned circuit including an inductance L30 and a capacitance C31 in which the inductance L30 is shunted by a varistor 40. As is well known to those skilled in the art, the effective resistance of the varistor 40 decreases as the magnitude of the current flowing therethrough increases; thus, the desired result of increasing the effective series resistance of the circuit at its resonant frequency as the R.M.S. amplitude of the electrical energy in the circuit increases is effected.

FIG. 4B shows a circuit in which the inductance L30 is shunted by a series circuit consisting of two oppositely poled Zener diodes 41 and 42. As is well known to those skilled in the art, such a circuit of oppositely poled Zener diodes presents a quite high impedance to voltages less than the breakdown value of the Zener diodes but for voltages above this breakdown value presents a substantially lower impedance. Again, the desired result is effected.

FIG. 4C shows a similar series resonant circuit in which the inductance L30 is shunted by a diode 43 and a biasing source 44. It is noted that the polarity of the biasing source 44 is such as to normally render diode 43 nonconductive. However, for amplitudes of electrical energy sufficiently great that the voltage drop across inductance L30 exceeds the magnitude of the biasing source 44, the back bias from the source is overcome and diode 43 is rendered conductive. Again, the effective resistance of the shunting element decreases as the R.M.S. amplitude of the electrical energy in the tuned circuit increases and the desired result is effected.

In each of the above illustrations of FIGS. 4A, 4B and 4C, the shunting elements have been across the inductance L30. They could equally well have been placed across the capacitance C31. However, the two terminals of a negative resistance source are ordinarily at a different D.C. potential so that if the shunting elements are placed across the capacitance C31, a direct current path exists between the terminals of different potential and a coupling capacitor must be used. By placing the components across the inductance L30 instead, the D.C. path is eliminated and capacitor C31 which resonates inductance L30 also serves as the coupling capacitor for the circuit.

Referring now to FIG. 5, therein is shown a multitone oscillator embodying the above described principles of the present invention. The circuit of FIG. 5 includes a first circuit 50 which includes terminals 51 and 52. Circuit 50, the details of which form no part of the present invention, may be any suitable circuit which exhibits an effective negative resistance between terminals 51 and 52. For example, the values of the shown elements for one suitable circuit may be:

| | | |
|---|---|---|
| Transistor **53***a* | type 2N1308 | |
| Transistor **53***b* | type 2N652 | |
| Battery **54** | volts | 6 |
| Resistance R**56** | ohms | 1000 |
| Resistance R**57** | do | 150 |
| Resistance R**58** | do | 27 |
| Resistance R**59** | do | 33 |
| Resistance R**60** | do | 82 |
| Resistance R**61** | do | 220 |

Connected in parallel between terminals 51 and 52 are a plurality, here shown as three, of series resonant circuits 64, 65, and 66, each including an inductance and a capacitance. The values of these inductances and capacitances may be chosen to provide the desired resonant frequencies, as is well known to those skilled in the art. Also in series with each of the series resonant circuits is a respective switch S64, S65 and S66. The frequencies at which the oscillator operates may be chosen by selectively operating these switches, which switches may be chosen from any of the many types of switches known to those skilled in the art, for example, a manual switch, the contacts of a relay, or an electronically operated switch such as a transistor or controlled rectifier.

A respective diode D64, D65 and D66 is associated with each of the series resonant circuits and is connected between the junction of the reactive elements in the series resonant circuits and a point 67 in the negative resistance circuit 50. The polarities of the diodes D64, D65 and D66 are such that the potential developed across resistor R58 normally biases each of these diodes into nonconduction unless the voltage appearing across the associated inductive element of the tuned circuits is greater than the voltage developed across resistor R58, in which case the greater inductive voltage overcomes the back bias of the diode and renders the diode conductive, thus greatly lowering its effective resistance. As was previously described, this decrease in effective resistance enables the circuit to operate within the linear characteristic region of negative resistance circuit 50 and enables the circuit to simultaneously oscillate at any desired combination of the three frequencies without any intermodulation between the three frequencies.

The output of the circuit, which may be any desired combination of the three possible frequencies, depending upon which of the switches S64, S65 and S67 is actuated, appears between terminals 68 and 69.

FIG. 6 shows a circuit arrangement similar to that of FIG. 5 but which includes means for generating a carrier wave signal which may be modulated by any desired combination of the plurality of frequencies at which the oscillator may operate.

The circuit of FIG. 6 again includes a negative resistance circuit 73 which exhibits an effective negative resistance between terminals 74 and 75. Again, the details of this circuit form no part of the present invention, and suitable values for the shown components may be as follows:

| | | |
|---|---|---|
| Transistors **76** and **77** | type 2N274 | |
| Battery **78** | volts | 6 |
| Resistance R**79** | ohms | 68 |
| Resistance R**80** | do | 750 |
| Resistance R**81** | do | 360 |
| Resistance R**82** | do | 330 |
| Resistance R**83** | do | 130 |
| Resistance R**84** | do | 820 |
| Resistance R**85** | do | 470 |
| Resistance R**86** | do | 160 |
| Resistance R**87** | do | 300 |
| Capacitance C**88** | microfarads | 30 |
| Capacitance C**89** | do | .038 |
| Capacitance C**90** | do | 3 |
| Capacitance C**91** | do | 30 |
| Capacitance C**92** | do | .05 |

Again, three series resonant circuits 95, 96 and 97 are shown connected in parallel between terminals 74 and 75, but any desired number of such series resonant circuits may be connected. Each of the circuits connected in parallel between terminals 74 and 75 includes the series connection of an inductance, a capacitance and a switch. Again, a diode is connected between the junction of the reactive elements and a point 94 in the negative resistance circuit, with the polarity of the diode being such that the D.C. voltage developed across resistance R80 is of such polarity to normally render the diodes nonconductive unless the voltage developed across the associated inductive elements of the series tuned circuits exceeds that developed across resistance R80.

Also connected between terminals 74 and 75 is the series circuit which includes a relatively high frequency resonant component 98 and a current limiting resistor R99, the value of which may be, for example, 91 ohms. The relative high frequency device 98, here shown as a barium titanate crystal, may be any suitable device for inducing carrier wave oscillations in the negative resistance circuit of a much greater frequency than that caused by the series resonant circuits 95, 96 and 97.

It is noted that crystal 98 has no shunting nonlinear resistance element such as does the other series resonant circuits in FIG. 6. Thus, the high frequency oscillations induced by crystal 98 drive the negative resistance circuit 73 into the nonlinear regions of its operating characteristics, as previously shown in FIG. 2A. Under these conditions the high frequency oscillations are amplitude limited by saturation or clipping in the negative resistance circuit 73 but at such a rapid rate that the effective negative resistance at the lower frequencies of tuned circuits 95, 96 and 97 remains virtually constant.

If the resonant frequency of crystal 98 is in the radio frequency range, such as, for example, 456 kc., and if the resonant frequencies of resonant circuits 95, 96 and 97 are in or near the audio frequency range, thus being substantially lower than the frequency of crystal 98, the high frequency oscillations from crystal 98 are amplitude modulated by the relatively lower frequency oscillations from the series tuned circuits, depending upon which of the switches S95, S96 and S97 are actuated. Thus, in the shown embodiment, the relatively higher frequency oscillations may be amplitude modulated by any desired one of seven possible combinations of the three lower frequency signals. Again, because of the principles of the present invention, no intermodulation products between the three relatively lower frequencies occurs in the circuit and thus the relatively higher frequency signal from crystal 98 is not modulated by any of the lower frequency intermodulation products.

The output signal of the circuit of FIG. 6 is developed across a loop stick antenna 93 in negative resistance circuit 73, and consists of a 456 kc. signal selectively amplitude modulated by combinations of the audio frequency signals generated in the lower frequency resonant circuits 95, 96 and 97. The circuit of FIG. 6 may be used in conjunction with any suitable receiver and filter system (not shown) to broadcast an information modulated carrier signal. For example, the shown circuit could be carried by a railroad locomotive or other vehicle and the switches S95, S96 and S97 could be selectively actuated to generate a modulated signal identifying the specific locomotive carrying the circuit. A suitable receiver could be positioned at a wayside point and could detect the signals and automatically identify the locomotive passing the wayside point.

While the principles of the invention have thus been described and several embodiments shown, it is understood that the invention is not limited to these shown embodiments, as many modifications will occur to those skilled in the art which still lie within the spirit and scope of the invention. It is thus intended the invention be limited in scope only by the appended claims.

Having thus described my invention, what I claim is:

1. An electrical circuit comprising a first circuit including a pair of terminals, said first circuit exhibiting a negative resistance characteristics between said pair of terminals, a tuned circuit component having a relatively high predetermined resonant frequency connected between said pair of terminals for developing a radio frequency carrier signal, a plurality of inductance-capacitance series tuned circuits connected between said pair of terminals, each of said series circuits tuned to resonate at a respective predetermined relatively lower frequency, a selective switch means for connecting only predetermined ones of said series tuned circuits between said pair of terminals, whereby said radio frequency carrier signal is modulated by selected ones of said predetermined lower frequencies and a respective impedance element connected in parallel with one of the reactive elements of each of said series tuned circuits, said impedance elements exhibiting a nonlinear resistance characteristic and modifying the effective resistance of said reactive elements to substantially prevent intermodulation among said series tuned circuits.

2. An electrical circuit comprising, a first circuit including a pair of terminals, said first circuit exhibiting a negative resistance characteristic between said pair of terminals, a tuned circuit component having a relatively high predetermined resonant frequency connected between said pair of terminals for developing a radio frequency carrier signal, a plurality of inductance-capacitance series tuned circuits connected between said pair of terminals, each of said series tuned circuits tuned to resonate at a respective predetermined relatively lower frequency, selective switching means for connecting only predetermined ones of said series tuned circuits between said pair of terminals, whereby said radio frequency carrier signal is modulated by selected ones of said predetermined lower frequencies and a respective diode and biasing means connected in parallel with one of the reactive elements in each of said series tuned circuits, said biasing means rendering said respective diode nonconductive until the magnitude of the voltage developed across its associated reactive element exceeds a predetermined value for modifying the effective resistance of said reactive elements to substantially prevent intermodulation among said series tuned circuits.

3. An electrical circuit comprising, a first circuit including a pair of terminals, said first circuit exhibiting a negative resistance characteristic between said pair of terminals, a tuned circuit component having a relatively high predetermined resonant frequency connected between said pair of terminals for developing a radio frequency carrier signal, a plurality of inductance-capacitance series tuned circuits connected between said pair of terminals, each of said series circuits tuned to resonate at a respective predetermined relatively lower frequency, selective switching means for connecting only predetermined ones of said series tuned circuits between said pair of terminals, whereby said radio frequency carrier signal is modulated by selected ones of said predetermined lower frequencies and a respective varistor connected in parallel with one of the reactive elements in each of said series tuned circuits for modifying the effective resistance of said reactive elements to substantially prevent intermodulation among said series tuned circuits.

4. An electrical circuit comprising, a first circuit including a pair of terminals, said first circuit exhibiting a negative resistance characteristic between said pair of terminals, a tuned circuit component having a relatively high predetermined resonant frequency connected between said pair of terminals for developing a radio frequency carrier signal, a plurality of inductance-capacitance series tuned circuits connected between said pair of terminals, each of said series circuits tuned to resonate at a respective predetermined relatively lower frequency, selective switching means for connecting only predetermined ones of said series tuned circuits between said pair of terminals, whereby said radio frequency carrier signal is modulated by selected ones of said predetermined lower frequencies and a respective series circuit comprising a pair of oppositely poled Zener diodes connected in parallel with one of the reactive elements in each of said series tuned circuits for modifying the effective resistance of said reactive elements to substantially prevent intermodulation among said series tuned circuits.

5. An electrical circuit comprising, a first circuit including a pair of terminals, said first circuit exhibiting a negative resistance characteristic between said pair of terminals, a radio frequency crystal connected between said pair of terminals for developing a carrier wave signal in said first circuit, a plurality of inductance-capacitance series tuned circuits connectable between said pair of terminals, each of said series circuits tuned to resonate at a respective predetermined frequency, selective switching means for connecting only predetermined ones of said series tuned circuits between said pair of terminals, whereby said carrier wave signal is modulated by selected ones of said predetermined frequencies, and a respective impedance element connected in parallel with one of the reactive elements in each of said series tuned circuits, said impedance elements exhibiting a nonlinear resistance characteristic and modifying the effective resistance of said reactive elements to substantially prevent intermodulation among said series tuned circuits.

6. An electrical circuit comprising, a first circuit including a pair of terminals, said first circuit exhibiting a negative resistance characteristic between said pair of terminals, a radio frequency crystal connected between said pair of terminals for developing a carrier wave signal in said first circuit, a plurality of inductance-capacitance series tuned circuits connectable between said pair of terminals, each of said series circuits tuned to resonate at a respective predetermined frequency, selective switching means for connecting only predetermined ones of said series tuned circuits between said pair of terminals, whereby said carrier wave signal is modulated by selected ones of said predetermined frequencies, and a respective impedance element connected in parallel with one of the reactive elements in each of said series tuned circuits, the resistance of said impedance elements decreasing as the magnitude of the current flowing in said series tuned circuits increases for modifying the effective resistance of said reactive elements to substantially prevent intermodulation among said series tuned circuits.

7. An electrical circuit comprising, a first circuit including a pair of terminals, said first circuit exhibiting a negative resistance characteristic between said pair of terminals, a radio frequency crystal connected between said pair of terminals for developing a carrier wave signal in said first circuit, a plurality of inductance-capacitance series tuned circuits connectable between said pair of terminals, each of said series circuits tuned to resonate at a respective predetermined frequency, selective switching means for connecting only predetermined ones of said series tuned circuits between said pair of terminals, whereby said carrier wave signal is modulated by selected ones of said predetermined frequencies, and a respective diode and biasing means connected in parallel with one of the reactive elements in each of said series tuned circuits, said biasing means rendering said respective diode nonconductive until the magnitude of the voltage developed across its associated reactive element exceeds a predetermined value for modifying the effective resistance of said reactive elements to substantially prevent intermodulation among said series tuned circuits.

References Cited by the Examiner

UNITED STATES PATENTS

| | | | |
|---|---|---|---|
| 1,984,424 | 12/1934 | Osnos | 331—162 |
| 2,059,587 | 11/1936 | Klotz et al. | 331—60 |
| 2,288,486 | 6/1942 | Rivlin | 331—60 |
| 2,852,680 | 9/1958 | Radcliffe | 331—115 |
| 2,897,451 | 7/1959 | Hammett | 331—60 |

FOREIGN PATENTS

| | | |
|---|---|---|
| 912,618 | 4/1946 | France. |

NATHAN KAUFMAN, *Acting Primary Examiner.*

JOHN KOMINSKI, ROY LAKE, *Examiners.*